US011879418B2

(12) United States Patent
Fitzgerald et al.

(10) Patent No.: US 11,879,418 B2
(45) Date of Patent: Jan. 23, 2024

(54) FUEL INJECTOR AND NOZZLE ASSEMBLY HAVING SPRAY DUCT WITH CENTER BODY FOR INCREASED FLAME LIFTOFF LENGTH

(71) Applicant: Caterpillar Inc., Peoria, IL (US)

(72) Inventors: Russell P Fitzgerald, Peoria, IL (US); Glen Clifford Martin, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 3 days.

(21) Appl. No.: 17/582,346

(22) Filed: Jan. 24, 2022

(65) Prior Publication Data

US 2023/0235717 A1 Jul. 27, 2023

(51) Int. Cl.

*F02M 29/06* (2006.01)
*F02M 35/10* (2006.01)
*F02M 67/02* (2006.01)
*F02M 69/04* (2006.01)
*F02M 69/08* (2006.01)

(52) U.S. Cl.

CPC ...... *F02M 29/06* (2013.01); *F02M 35/10085* (2013.01); *F02M 35/10216* (2013.01); *F02M 67/02* (2013.01); *F02M 69/047* (2013.01); *F02M 69/08* (2013.01)

(58) Field of Classification Search

CPC ............. F02M 29/06; F02M 35/10085; F02M 35/10216; F02M 67/02; F02M 69/047; F02M 69/048; F02M 61/1806; F02M 61/162

See application file for complete search history.

(56) References Cited

U.S. PATENT DOCUMENTS

| | | | | |
|---|---|---|---|---|
| 5,499,769 | A | 3/1996 | Namiki et al. | |
| 5,772,122 | A | 6/1998 | Sugiura et al. | |
| 9,518,547 | B2 | 12/2016 | John | |
| 9,909,549 | B2 | 3/2018 | Mueller | |
| 10,012,196 | B1 * | 7/2018 | Qi | F02B 23/0648 |
| 10,036,356 | B2 * | 7/2018 | Svensson | F02M 55/00 |
| 10,808,601 | B2 | 10/2020 | Hashizume | |
| 10,883,454 | B2 | 1/2021 | Amayah et al. | |
| 2014/0084085 | A1 * | 3/2014 | Hongo | B05B 1/34 239/584 |
| 2016/0298531 | A1 * | 10/2016 | Anders | F02M 61/1806 |
| 2017/0009712 | A1 * | 1/2017 | Svensson | F01P 3/02 |
| 2017/0114763 | A1 * | 4/2017 | Mueller | F02P 23/02 |
| 2019/0063391 | A1 * | 2/2019 | Martin | F02M 61/1806 |

* cited by examiner

*Primary Examiner* — Grant Moubry

(74) *Attorney, Agent, or Firm* — Brannon Sowers & Cracraft PC

(57) ABSTRACT

A fuel injector includes a nozzle body, and spray ducts coupled to the nozzle body and in spray path alignment with spray orifices therein. A nozzle check is movable within the nozzle body to open and close the spray orifices. Each of the spray ducts defines a duct center axis, and includes a center body forming, together with a duct inner surface, a spray jet passage circumferential of the duct center axis and reduced in area in a direction of spray jet advancement from the nozzle body.

16 Claims, 3 Drawing Sheets

FUEL INJECTOR AND NOZZLE ASSEMBLY HAVING SPRAY DUCT WITH CENTER BODY FOR INCREASED FLAME LIFTOFF LENGTH

TECHNICAL FIELD

The present disclosure relates generally to a ducted fuel injector, and more particularly to a fuel injector spray duct structured to increase a velocity of a jet of fuel by way of a reduction in area of a spray jet passage through the spray duct.

BACKGROUND

Modern internal combustion engines include one or more cylinders each with an associated piston to define a combustion chamber. Fuel for combustion is delivered into the combustion chamber by, for example, directly injecting the fuel using a fuel injector. Such fuel injectors have at least one and typically several spray orifices, the opening and closing of which is controlled by way of an electrically or hydraulically actuated outlet check.

Varying fuel and air mixtures, different fuel delivery parameters, equivalence ratios and other factors can produce a range of results during combustion. Certain constituents in exhaust from an internal combustion engine are often filtered, chemically reduced, or otherwise treated to limit discharge of those constituents to the environment. In recent years there has been great interest in controlling and/or managing the manner and mechanisms of combustion in an effort to control the exhaust emissions profile of internal combustion engines. Notable amongst the emissions it is generally desirable to limit are particulate matter and oxides of nitrogen or "NOx."

Ducted fuel injection assemblies have been implemented in internal combustion engines to enhance mixing and reduce the amount of particulate matter, namely, soot, formed within the combustion chamber. Ducted assemblies typically include one or more tubular structures coupled to the cylinder head in the engine and positioned such that the ducts receive fuel spray jets from the fuel injector. The fuel spray tends to interact with the ducts, to ultimately enhance mixing of the fuel with air, in particular by increasing the so called "liftoff length" of the fuel spray jets to enable air to mix with the plumes of fuel.

One known ducted fuel injection application is set forth in U.S. Pat. No. 10,012,196B1 and entitled Duct Structure for Fuel Injector Assembly. While known ducted fuel injection techniques show promise for widespread application, there is always room for improvement and alternative strategies.

SUMMARY

In one aspect, a fuel injector includes a nozzle body having a plurality of spray orifices formed therein, and a plurality of spray ducts coupled to the nozzle body and in spray path alignment with the plurality of spray orifices. The fuel injector further includes a nozzle check movable within the nozzle body between an open position, and a closed position blocking the plurality of spray orifices. Each of the plurality of spray ducts defines a duct center axis, and includes a duct inner surface, and a center body forming, together with the duct inner surface, a spray jet passage extending circumferentially around the duct center axis and reduced in area in a direction of spray jet advancement from the nozzle body.

In another aspect, a fuel injector nozzle assembly includes a nozzle body defining a nozzle center axis and including an inner nozzle surface, an outer nozzle surface, and a spray orifice extending from the inner nozzle surface to the outer nozzle surface and oriented angularly to the nozzle center axis. The nozzle assembly further includes a spray duct coupled to the nozzle body in spray path alignment with the spray orifice. The spray duct includes a duct wall extending between a duct inlet and a duct outlet, and a center body coupled to the duct wall and positioned in a spray jet path extending between the duct inlet and the duct outlet. A spray jet passage is defined peripherally between the duct wall and the center body.

In still another aspect, a method of operating an internal combustion engine system includes moving an outlet check in a fuel injector of an engine system from a closed position to an open position to fluidly connect a nozzle chamber in the fuel injector containing pressurized fuel to a spray orifice in the fuel injector. The method further includes advancing a jet of pressurized fuel from the spray orifice based on the moving of an outlet check through a spray jet passage formed between a center body and a duct wall of a spray duct. The method further includes increasing a velocity of the jet of the pressurized fuel based on a reduction in area of the spray jet passage from an inlet to an outlet of the spray duct, and injecting the jet of pressurized fuel from the spray duct into a combustion chamber of an engine in the internal combustion engine system.

DETAILED DESCRIPTION

Figure 1:
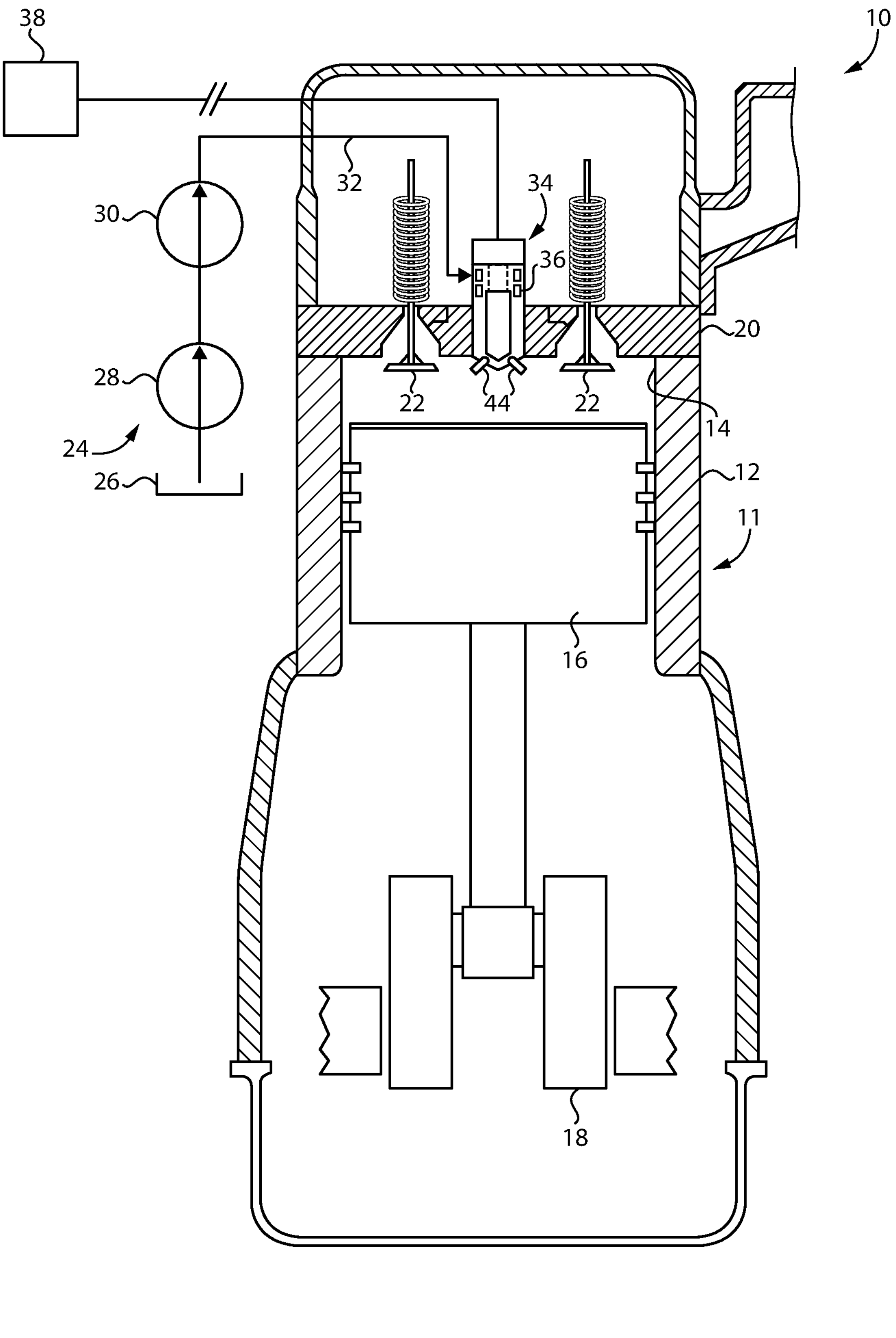
FIG. 1 is a partially sectioned diagrammatic view of an internal combustion engine system, according to one embodiment.

Referring to FIG. 1, there is shown an internal combustion engine system 10, according to one embodiment. Engine system 10 includes an engine 11 having an engine housing 12 with a combustion cylinder 14 formed therein. Cylinder 14 may be one of a plurality of cylinders having any number and in any suitable arrangement. A piston 16 is movable within cylinder 14 between a top dead center position and a bottom dead center position, typically in a conventional four-cycle pattern. In a practical implementation, engine system 10 is compression-ignited with piston 16 increasing a pressure of fluids within cylinder 14 to an autoignition threshold in a compression stroke. Piston 16, and any other such pistons in engine system 10, is coupled to crankshaft 18 in a generally conventional manner. Engine system 10 may operate a generator, a pump, a compressor, or a transmission to propel a vehicle, to name a few examples. An engine head 20 is attached to engine housing 12 and supports a plurality of engine valves 22, typically including at least one exhaust valve and at least one intake valve. Additional equipment of engine system 10 not depicted in FIG. 1 can include an intake system having a compressor in a turbocharger, and an exhaust system containing exhaust aftertreatment apparatus, for instance.

Engine system 10 also includes a fuel system 24. Fuel system 24 may include a fuel supply such a fuel tank 26, a low-pressure pump 28, and a high-pressure pump. High-pressure pump 30 feeds pressurized fuel to a fuel conduit 32 that may include a pressurized fuel reservoir or "common rail" storing fuel for delivery to a plurality of fuel injectors of fuel system 24, one of which is shown at numeral 34. Each cylinder 14 in engine system 10 may be equipped with one fuel injector 34, supported in engine head 20 and positioned to extend partially into the corresponding cylinder 14. Fuel injector 34 may include an electrical actuator 36 operable to actuate an injection control valve of fuel injector 34 according to well-known principles. An electronic control unit or ECU 38 is electrically connected to electrical actuator 36. In an implementation, ECU 38 is electrically connected to at least one electrical actuator in each fuel injector of fuel system 24. Fuel injector 34 may be equipped with spray ducts 44. As will be further apparent from the following description, spray ducts 44 are uniquely configured for improved performance based on acceleration of spray jets of pressurized fuel injected from fuel injector 34 into cylinder 14.

Figure 2:
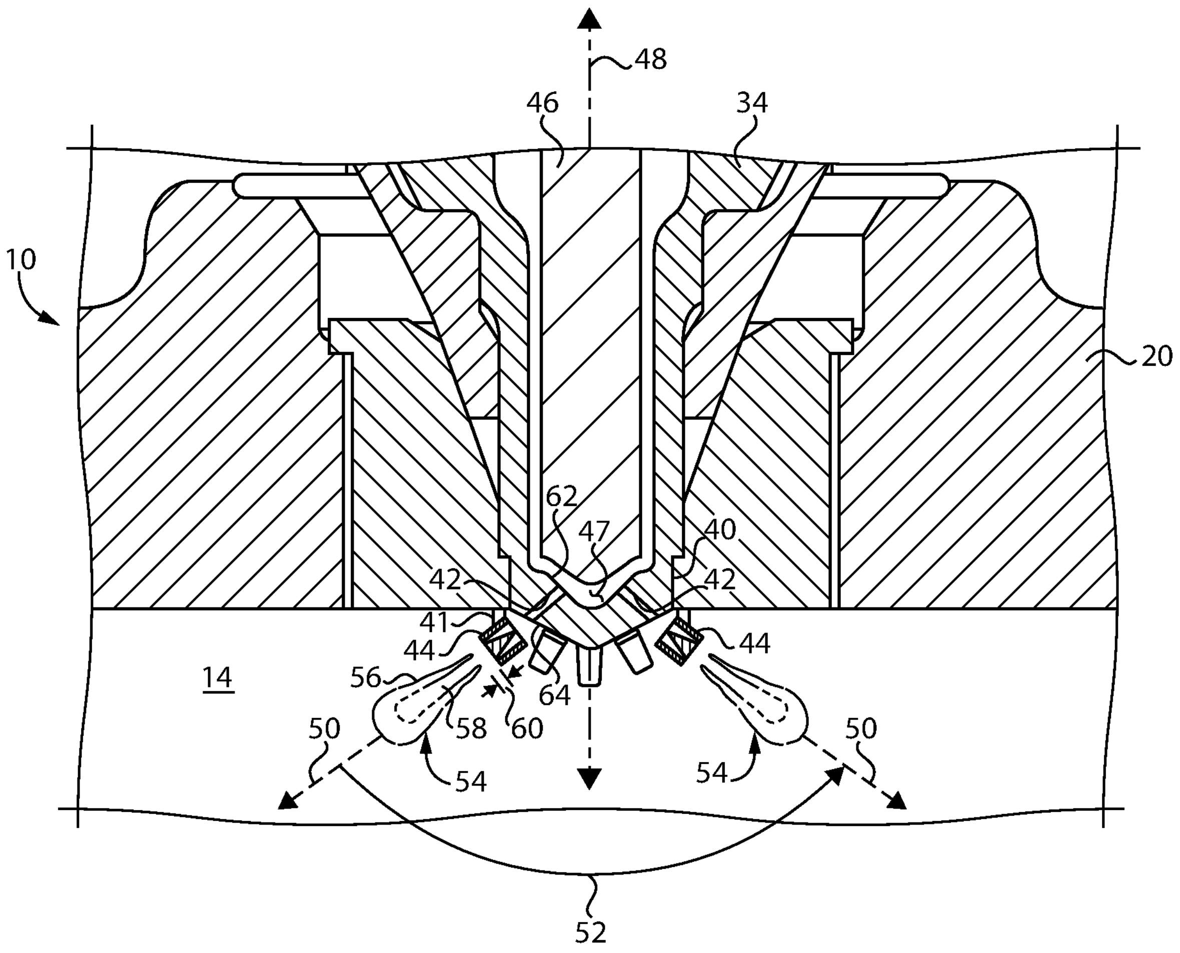
FIG. 2 is a sectioned diagrammatic view of a portion of the engine system as in FIG. 1.

Referring also now to FIG. 2, fuel injector 34 includes a nozzle body 40 having a plurality of spray orifices 42 formed therein and each extending from an inner nozzle surface 62 to an outer nozzle surface 64 and oriented angularly to a nozzle center axis 48 defined by nozzle body 40. Nozzle body 40 and one or more spray ducts 44 form a fuel injector nozzle assembly. A nozzle check 46 is movable within nozzle body 40 between an open position, and a closed position blocking spray orifices 42. In an implementation, nozzle check 46 is directly controlled based upon a hydraulic pressure applied to a closing hydraulic surface thereof (not shown). Electrical actuator 36 can operate to actuate an injection control valve that varies the hydraulic pressure, according to known practices. Fuel injector 34 also includes a plurality of spray ducts 44 coupled to nozzle body 40 and in spray path alignment with spray orifices 42. A mount 41 may be attached to each of spray ducts 44 and also attached to engine head 20 approximately as shown in FIG. 2. Mount 41 could have the form of an annular ring or the like welded or otherwise fastened to engine head 20. In other embodiments spray ducts 44 could be attached directly to nozzle body 40. As used herein, the term "spray path alignment" means that ducts 44 are positioned to receive therethrough a fuel spray from one of spray orifices 42. Spray path alignment might not be perfect coaxial alignment, and could instead include an offset or canted orientation of ducts 44 relative to a spray trajectory.

Each of ducts 44 defines a duct center axis 50. A spray angle 52 is defined between duct center axes 50. In an implementation, spray angle 52 is greater than 100°, and may be greater than 120° in some embodiments. Ducts 44 can be of any number, including 1, and positioned at a uniform spray angle or a varying spray angle amongst a plurality of ducts 44. Ducts 44 may be of uniform shape and size, or of varying shapes and sizes in some embodiments. It should also be appreciated that fuel injector 34 is illustrated having a single outlet nozzle check. In other instances multiple checks, such as multiple side-by-side checks or concentric checks might be used to provide a range of fuel injection amounts, spray patterns, or other features using, at times, less than all of a plurality of spray ducts 44.

Also shown in FIG. 2 are spray jets of pressurized fuel advanced outwardly from ducts 44 generally along duct center axes 50. Each spray jet 54 includes an annular jet, having at least initially an annular shape upon exiting a respective one of ducts 44, a rich jet periphery 56 and a lean jet core 58. The terms "rich" and "lean" used herein are relative terms which can be understood in relation to one another. Thus, rich jet periphery 56 may include some entrained air and lean jet core 58 may include some fuel. As advancement of each spray jet 54 into cylinder 14 proceeds outwardly atomized or atomizing liquid fuel can transition at least in part to fuel vapor. In a practical implementation, engine system 10 operates on a liquid fuel, such as a diesel distillate fuel, however, the present disclosure is not thereby limited and other suitable compression-ignition liquid fuels as well as blends might be used. FIG. 2 also depicts a liftoff length 60 of spray jets 54. The liftoff length can be understood as a distance between the point of which a spray jet exits a duct and the point at which combustion of the injected fuel and flame formation begins. Those skilled in the art will appreciate that enhanced liftoff length can be associated with improved performance especially concerning certain emissions such as soot. Based on acceleration of fuel spray through ducts 44 as further discussed herein, liftoff length 60 may be relatively longer as compared to other fuel injection strategies including other ducted fuel injection strategies.

Figure 3:
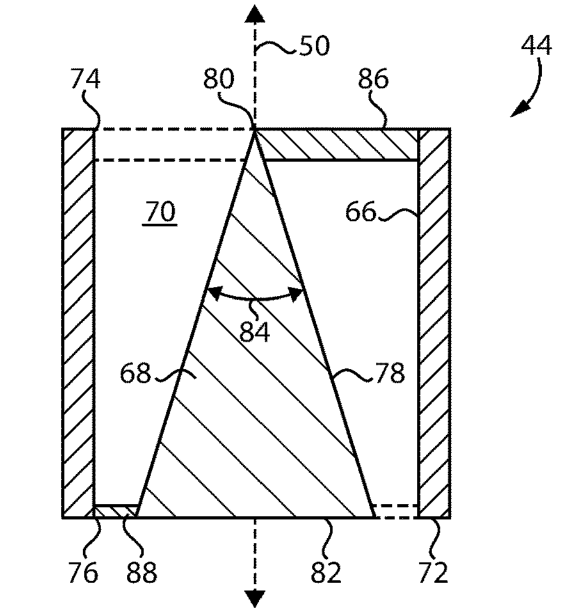
FIG. 3 is a sectioned side diagrammatic view of a spray duct, according to one embodiment.

Referring also now to FIG. 3, there is shown a spray duct 44 according to the present disclosure in further detail. Duct 44 defines a duct center axis 50 as noted above, and includes a duct wall 72 having a duct inner surface 66. Duct inner surface 66 may be cylindrical, although the present disclosure is not thereby limited, and extends circumferentially around duct center axis 50. Duct inner surface 66 further extends between a duct inlet 74 and a duct outlet 76. Duct 44 also includes a center body 68 coupled to duct wall 72 and positioned in a spray jet path defined by an associated spray orifice 42. Center body 68 forms, together with duct inner surface 66, a spray jet passage 70 extending circumferentially around duct center axis 50 and reduced in area in a direction of spray jet advancement from nozzle body 40, and thus narrowed from duct inlet 74 to duct outlet 76. Spray jet passage 70 is thus understood to be defined peripherally between duct wall 72 and center body 68 and may be fully circumferential of center body 68 between duct inlet 74 and duct outlet 76. A reduction in area from duct inlet 74 to duct outlet 76 may be greater than 70%. In a refinement, the reduction in area may be greater than 80%, and in a further refinement the reduction in area may be approximately 83%. The present disclosure is also not limited in this regard, however, and an actual reduction in cross-sectional flow area through a given duct can vary from the listed amounts so long as some acceleration of a spray jet through the duct can be realized.

Center body 68 may include a center body outer surface 78 tapered in the direction of spray jet advancement. The direction of spray jet advancement will be understood to be a downward direction in the illustration of FIG. 3, thus the tapering of center body outer surface 78 can be understood as an enlarging taper in the subject direction of spray jet enhancement. Center body outer surface 78 may be conoidal and extends between a leading cone peak 80 located on duct center axis 50 and a trailing cone base 82. In the illustration of FIG. 3 center body 68 is depicted as a right circular cone. The term "conoidal" includes shapes that are true cones, as well as shapes that approximate a cone. Thus, center body outer surface 78 could be convex or concave, or potentially still another shape such as a complex shape transitioning between concave and convex portions and still be considered conoidal. A cone angle 84 is defined by center body outer surface 78 and may have a range of sizes. In an implementation, cone angle 84 is less than 45°, however, the present disclosure is not thereby limited. Cone peak 80 faces a direction of a corresponding spray orifice 42 and is depicted as tapering to a point. In other embodiments, cone peak 80 could be hemispheric, flat, or still another shape.

Figure 4:
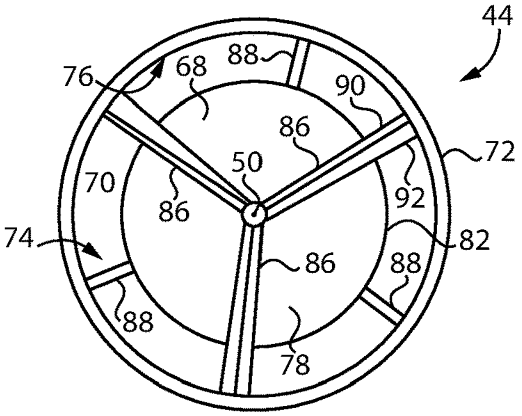
FIG. 4 is an end view of a spray duct as in FIG. 3.

Referring also now to FIG. 4, there is shown an end view of a spray duct 44 as in FIG. 3. In FIG. 4 duct inlet 74 opens in a direction away from the plane of the page. Duct inlet 74 is thus open to receive a spray jet from a spray orifice 42, and the spray jet impinges upon center body outer surface 78 to spread radially outward around center body 68 in a direction of duct outlet 76 into the page in FIG. 4. Duct outlet 76 can thus be seen to have a smaller area than duct inlet 74 and extends circumferentially around cone base 82. Duct 44 also includes at least one support 86 and 88 connecting between duct inner wall 66 and center body 68. In the illustrated embodiment, a plurality of supports 86 and 88 are provided arranged in an inlet set 86, and an outlet set 88 spaced from inlet set 86 in the direction of spray jet advancement. As can also be seen from FIG. 4 the inlet set 86 includes 3 supports uniformly spaced circumferentially around duct center axis 50. The outlet set 88 also includes 3 supports spaced circumferentially around duct center axis 50 but offset from the inlet set 86. The at least one support 86, 88 may also include a vane or other structure oriented to impart swirl to fuel spray through spray jet passage 70. In the illustrated embodiment each of supports 86 includes a leading edge 90 and a trailing edge 92 and includes surface extending angularly between leading edge 90 and trailing edge 92 to form a vane or blade that is impinged upon by fuel spray to impart swirl. The outlet set 88 could include one or more analogously configured structures.

Figure 5:
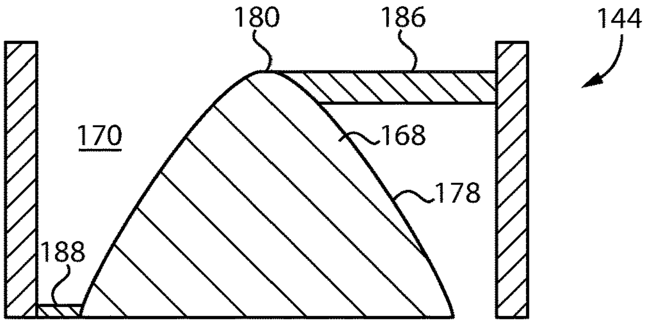
FIG. 5 is a sectioned side diagrammatic view of a spray duct, according to another embodiment.

Turning to FIG. 5, there is shown a spray duct 144 according to another embodiment. Spray duct 144 includes a conoidal center body 168 having a convex center body outer surface 178. Center body 168 also includes a cone peak 180 that is generally hemispheric in shape. Duct 144 includes a total of one support 186 in an inlet set and a total of one support 188 in an outlet set. A spray passage 170 extends circumferentially around center body 168. Those skilled in the art will appreciate various alternative duct and center body configurations to those disclosed.

INDUSTRIAL APPLICABILITY

Referring to the drawings generally, but returning focus back to FIG. 2, there can be seen the plurality of spray ducts 44 spaced circumferentially around nozzle center axis 48 and angularly oriented relative to nozzle center axis 48. Nozzle check 46 is shown as it might appear having been moved from a closed position to an open position, fluidly connecting a nozzle chamber 27 in fuel injector 34 to spray orifices 42. Based on moving nozzle check 46 to an open position, jets of pressurized fuel from spray orifices 42 are advanced through spray jet passage 70 formed between center body 68 and duct wall 72 in each of ducts 44. Based on a reduction in area of spray jet passage 70 from duct inlet 74 to duct outlet 76 a velocity of the jets of pressurized fuel is increased according to well-known principles. With spray jet velocity thusly increased spray jets 54 are injected from each duct 44 into the combustion chamber formed by cylinder 14 in engine 11 of internal combustion engine system 10.

As discussed herein, within each duct 44 the spray jet impinges upon center body outer surface 78 and is distributed in spray jet passage 70. In the case of the illustrated embodiments, some swirl can be imparted to fuel of the spray jet by way of a vane or like structure connecting between duct wall 72 and center body 68. As also noted above, the increased velocity of the jet of pressurized fuel contributes to an extended liftoff length, entraining air and producing lean jet core 58.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A fuel injector comprising:

a nozzle body having a plurality of spray orifices formed therein;

a plurality of spray ducts coupled to the nozzle body and in spray path alignment with the plurality of spray orifices;

a nozzle check movable within the nozzle body between an open position, and a closed position blocking the plurality of spray orifices; and each of the plurality of spray ducts defining a duct center axis, and including a duct inner surface, and a center body forming, together with the duct inner surface, a spray jet passage extending circumferentially around the duct center axis and reduced in area in a direction of spray jet advancement from the nozzle body.

2. The fuel injector of claim 1 wherein the center body includes a center body outer surface tapered in the direction of spray jet advancement.

3. The fuel injector of claim 2 wherein the center body outer surface is conoidal and extends between a leading cone peak located on the duct center axis and a trailing cone base.

4. The fuel injector of claim 3 wherein an outlet of the spray jet passage is defined between the duct inner surface and the center body and extends circumferentially around the trailing cone base.

5. The fuel injector of claim 1 further comprising at least one support connecting between the duct inner surface and the center body.

6. The fuel injector of claim 5 wherein the at least one support is one of a plurality of supports spaced circumferentially around the duct center axis and located within the spray jet passage.

7. The fuel injector of claim 6 wherein the plurality of supports are arranged in an inlet set and an outlet set spaced from the inlet set in the direction of spray jet advancement.

8. The fuel injector of claim 6 wherein the at least one support includes a vane oriented to impart swirl to fuel spray through the spray jet passage.

9. The fuel injector of claim 1 wherein the nozzle body defines a nozzle center axis, and the plurality of spray ducts are spaced circumferentially around the nozzle center axis and angularly oriented relative to the nozzle center axis.

10. A fuel injector nozzle assembly comprising:

a nozzle body defining a nozzle center axis and including an inner nozzle surface, an outer nozzle surface, and a spray orifice extending from the inner nozzle surface to the outer nozzle surface and oriented angularly to the nozzle center axis;

a spray duct coupled to the nozzle body in spray path alignment with the spray orifice;

the spray duct including a duct wall extending between a duct inlet and a duct outlet, and a center body coupled to the duct wall and positioned in a spray jet path extending between the duct inlet and the outlet; and a spray jet passage is defined peripherally between the duct wall and the center body.

11. The nozzle assembly of claim 10 wherein the spray jet passage is fully circumferential of the center body between the duct inlet and the duct outlet.

12. The nozzle assembly of claim 11 wherein the spray duct further includes at least one support within the spray jet path and connecting the center body to the duct wall.

13. The nozzle assembly of claim 11 wherein the center body is conoidal.

14. The nozzle assembly of claim 13 wherein the duct wall includes a cylindrical duct inner surface.

15. The nozzle assembly of claim 13 wherein the center body includes a cone peak facing a direction of the spray orifice.

16. The nozzle assembly of claim 13 wherein the center body defines a cone angle less than 45°.

* * * * *